United States Patent [19]

Lambert

[11] Patent Number: 5,294,773

[45] Date of Patent: Mar. 15, 1994

[54] SYSTEM FOR CONTROLLING A HIGH PLASMA TORCH WITH HIGH FLOW RATES OF PLASMA-GENERATING GAS

[75] Inventor: Jean-Marie Lambert, Saint Medard en Jalles, France

[73] Assignee: Societe Anonyme dite: Aerospatiale Societe Nationale Industrielle, Paris, France

[21] Appl. No.: 42,482

[22] Filed: Apr. 2, 1993

[30] Foreign Application Priority Data

Apr. 10, 1992 [FR] France .................. 92 04438

[51] Int. Cl.$^5$ .............................................. B23K 9/00
[52] U.S. Cl. .......................... 219/121.54; 219/121.55; 219/121.48; 219/171.57; 219/171.49
[58] Field of Search ................ 219/121.54, 121.55, 219/121.56, 121.57, 75, 121.49, 121.48

[56] References Cited

U.S. PATENT DOCUMENTS

| | | | |
|---|---|---|---|
| 3,646,311 | 2/1972 | Cameron et al. | 219/121.54 |
| 3,819,840 | 6/1974 | Schultz | 13/1 |
| 3,988,566 | 10/1976 | Vogts et al. | 219/121.55 |
| 4,122,327 | 10/1978 | Vogts et al. | 219/121.54 |
| 4,156,125 | 5/1979 | Brown | 219/121.54 |
| 4,663,515 | 5/1987 | Kneeland et al. | 219/121.54 |
| 4,692,584 | 9/1987 | Caneer, Jr. | 219/121.54 |
| 4,916,283 | 4/1990 | Nagasaka et al. | 219/121.54 |

FOREIGN PATENT DOCUMENTS

| | | |
|---|---|---|
| 0223633 | 5/1987 | European Pat. Off. . |
| 3532367 | 3/1987 | Fed. Rep. of Germany . |
| 2142142 | 1/1973 | France . |

*Primary Examiner*—Mark H. Paschall
*Attorney, Agent, or Firm*—Marshall, O'Toole, Gerstein, Murray & Borun

[57] ABSTRACT

System for controlling a plasma torch generating high power, including a rectifier feeding said torch; a circuit feeding said torch with plasma-generating gas, controlled by a regulating valve; and a controller for controlling the rectifier and the valve in order to control the arc current and the plasma-generating gas flow rate. The valve is actuated by an electropneumatic positioner associated with a pneumatic flow amplifier, the controller receives measurements of the arc voltage and arc current and delivers to the rectifier and to the electropneumatic positioner respectively, arc current and plasma-generating gas flow rate reference values adapted to produce a desired electrical reference power.

4 Claims, 2 Drawing Sheets

SYSTEM FOR CONTROLLING A HIGH PLASMA TORCH WITH HIGH FLOW RATES OF PLASMA-GENERATING GAS

The present invention relates to a system controlling a power plasma torch.

A system for controlling a power plasma torch is already known from French Patent FR-A-2,588,145, the system including:
- a rectifier, fed by an electrical mains and supplying a DC supply voltage to the electrodes of said torch;
- a circuit feeding said torch with plasma-generating gas, the flow rate of said gas being controlled by a regulating valve; and
- means for controlling said rectifier and said valve in order to control the arc current and the plasma-generating-gas flow rate.

In reality, such a control system is only intended for preventing arc extinction. In fact, in such a plasma torch, it is known that the arc current decreases when the arc voltage increases, and vice versa. Since the arc voltage is upperly limited by the voltage performance characteristics of the supply rectifier of the torch, the arc becomes unstable as soon as the arc voltage increases so as to approach the maximum voltage capable of being delivered by said supply rectifier.

In addition, in the aforementioned patent, said control means are constituted by an electronic device, which simply includes an arc-voltage threshold detector and a variable-gain amplifier, said device being intended to lower the arc voltage, as soon as the latter reaches an instability threshold, by making the arc current increase momentarily and by decreasing the plasma-generating-gas flow rate feeding said plasma torch. This is therefore a fixed system only enabling the arc to be stabilized.

The subject of the present invention is a flexible system, enabling not only the arc to be stabilized, but also the torch to be completely and automatically controlled in order to force the latter to operate in accordance with one or more items of reference data.

For this purpose, according to the invention, the system for controlling a power plasma torch, including:
- a rectifier fed by an electrical mains and supplying a DC supply voltage to the electrodes of said torch;
- a circuit feeding said torch with plasma-generating gas, the flow rate of said gas being controlled by a regulating valve;
- means for controlling said rectifier and said valve in order to control the arc current and the plasma-generating-gas flow rate;
- first means for continuously measuring the arc voltage; and
- second means for continuously measuring the arc current, is noteworthy:
- in that said valve for regulating the plasma-generating gas is of the pneumatic-actuation type and is actuated by an electropneumatic positioner associated with a pneumatic flow amplifier; and
- in that said control means, on the one hand, receive the arc-voltage and arc-current measurements delivered respectively by said first and second measuring means and, on the other hand, deliver, to said rectifier and to said electropneumatic positioner respectively, arc-current and plasma-generating-gas flow rate reference values calculated according to a program, as a function of an electrical reference power.

Thus, it is possible to control said plasma torch in terms of power, by continuously controlling the arc current and the flow rate of plasma-generating gas. It will be noticed that, by virtue of the choice of a pneumatic-actuation valve for regulating the flow rate of the plasma-generating gas, which valve is actuated by an electropneumatic positioner associated with a pneumatic flow amplifier, the variations in the opening and closing of the valve are rendered compatible with the variations in the reference values delivered by said control means. In fact, by virtue of the flow amplifier, which acts as an accelerator, the opening and closing response time of said valve is greatly shortened.

Said control means may be constituted by a computer or else by an automatic machine. They put the torch into operation with a predetermined power and they control the increase or decrease in power by controlling the arc current and the plasma-generating-gas flow rate. When the actual electrical power of the torch is close to said electrical reference power, said control means continuously regulate by controlling the arc current and the plasma-generating-gas flow rate, whilst controlling the arc voltage, in order to prevent arc extinction.

Said control means work sequentially, according to cycles, the duration of which is, for example, equal to a few seconds, but they act, however, immediately and as a priority, on the arc current and the plasma-generating-gas flow rate in the event of risk of arc extinction.

Said electrical reference power may be selected, by an operator or by a supervising computer, taking into account the parameters of a process to be controlled with which said plasma torch is involved, and said electrical reference power may be entered into said control means. However, because of the heat losses involved in the operation of the torch, it may turn out that the thermal power actually supplied by the torch is less than that which corresponds in theory to said displayed electrical reference power.

In addition, according to an embodiment variant, the system in accordance with the present invention includes additional measuring means for determining the flow rate, the inlet temperature and the outlet temperature of the fluid (demineralized water, for example) for cooling the torch, these additional measuring means supplying their measurements to said control means, the flow rate of the cooling fluid, combined with said inlet and outlet temperatures, enables, to a first approximation, heat losses in the torch to be determined, so that said control means can take them into account in order to establish the electrical reference power from a thermal reference power.

Thus, the electrical reference power takes into account losses involved in the operation of the torch and a thermal power in agreement with that desired is obtained.

In order to improve further the accuracy of the actual thermal power obtained, additional sixth, seventh and eighth measuring means may be provided which determine the flow rate, the temperature and the pressure of the plasma-generating gas in said circuit and which supply their measurements to said control means, which take them into account in the establishment of said electrical reference power from said thermal reference power. The enthalpy of the plasma-generating gas is thus taken into account.

Said thermal reference power may be selected, by an operator or by a supervising computer, taking into account the parameters of a process to be controlled, and entered into said control means.

Moreover, it is known that in many industrial processes a plasma torch is used to superheat a primary blast which is injected into a tuyere (for example a tuyere of a blast furnace, cupola furnace, etc.). The primary-blast flow rate and the temperature of the latter are time-dependent variables, which has the effect of causing the temperature of the burden to vary by amounts which are often harmful to the stabilization of the running of the process and of the product smelted.

Thus, it is necessary to ensure, by taking advantage of the flexibility and of the rapidity of the rise in power of the torch, a constant temperature at the mixing of the blast and plasma, within the limits of available electrical power.

For such an application, it is therefore advantageous to provide additional ninth, tenth and eleventh measuring means which determine the flow rate, the temperature and the pressure of said blast and which supply their measurements to said control means which establish said thermal reference power, and then said electrical reference power, from a reference temperature for said blast heated by the plasma of said torch.

Such a reference temperature is preferably selected by an operator or by a supervising computer, taking into account the parameters of a process to be controlled, and is entered into said control means.

The figures of the attached drawing will make it clearly understood how the invention may be produced. In these figures, identical references designate similar elements.

DETAILED DESCRIPTION OF DRAWINGS

Figure 1:
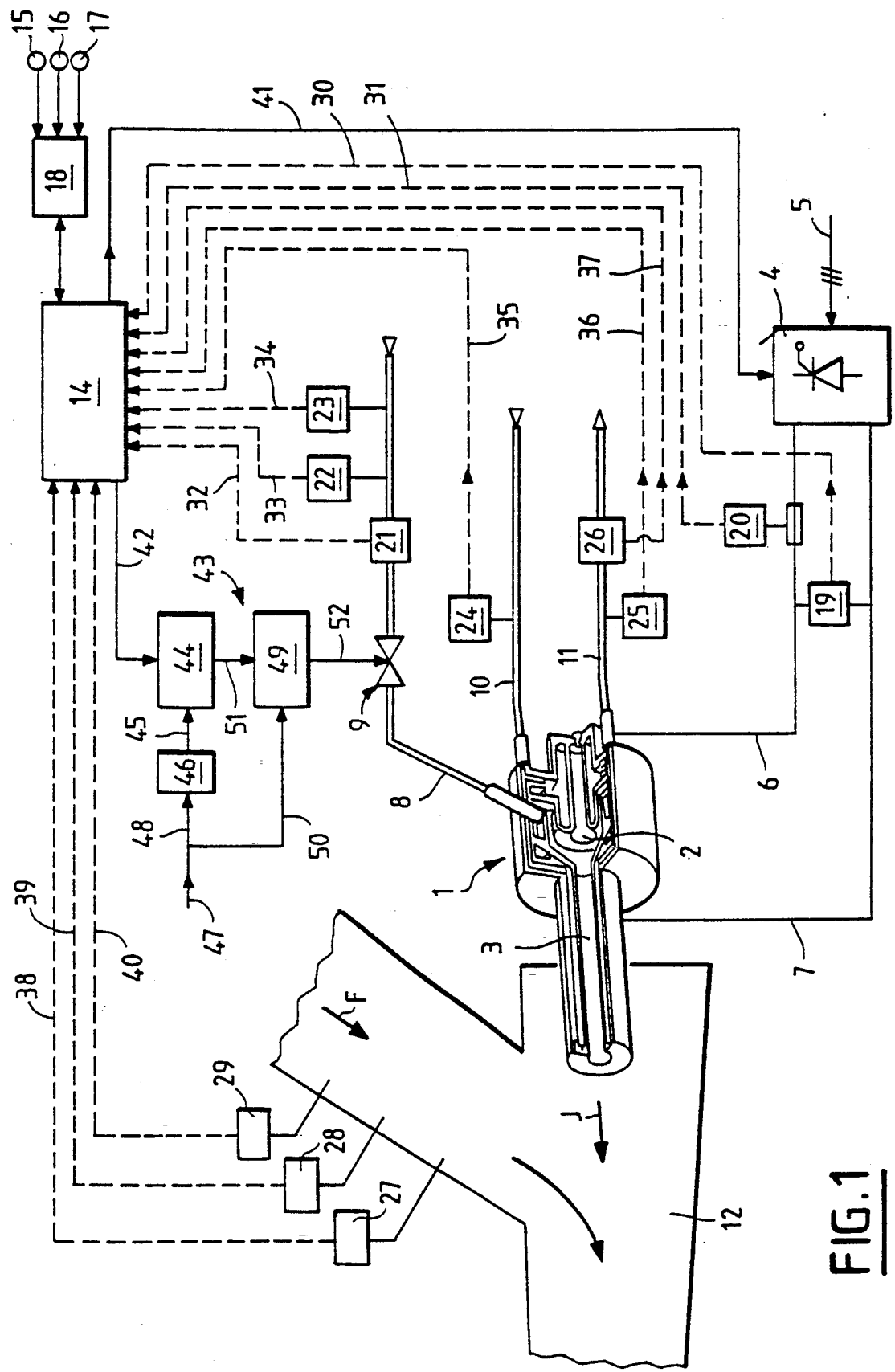
FIG. 1 is a diagram of one embodiment of the system in accordance with the present invention.

The control system, in accordance with the present invention and represented by FIG. 1, is intended for a power plasma torch 1 including an upstream electrode 2 and a downstream electrode 3 between which an electric arc is produced. In order to do this, a voltage generated by a rectifier 4, fed from a mains 5, is applied between said electrodes 2 and 3. For this purpose, the electrodes 2 and 3 are connected to the rectifier 4 via connections 6 and 7 respectively.

The torch 1 is fed with plasma-generating gas (for example pressurized air) via a circuit 8 in which a pneumatic-actuation flow-regulating valve 9 is mounted. This valve is, for example, of the Camflex type, manufactured by the French Company MASONEILAN.

Moreover, a cooling fluid, for example demineralized water, flows through the torch 1, entering via a pipe 10 and leaving via a pipe 11.

In the example shown in FIG. 1, the torch 1 is intended to preheat a blast-furnace blast (symbolized by the arrow F). In order to do this, the said blast and the plasma jet (symbolized by the arrow J) blown by the torch 1 are brought into contact in a mixing tuyere 12.

The control system includes program control means 14, for example a computer or automatic machine, for controlling the torch 1. An operator or a process-supervising computer (which are not shown) may put into the control means 14 desired reference values by display at inputs 15, 16, 17 of an interface device 18. The inputs 15, 16 and 17 enable, for example, reference values for the electrical power, the thermal power and the temperature of the blast/plasma-jet mixture to be displayed.

Moreover, the control system includes:

- an apparatus 19 for measuring the arc voltage Ua, arranged between the connections 6 and 7;
- an apparatus 20 for measuring the arc current Ia, arranged in the connection 6;
- an apparatus 21 for measuring the flow rate Qa of plasma-generating gas, arranged in the circuit 8;
- an apparatus 22 for measuring the temperature Ta of the plasma-generating gas in the circuit 8;
- an apparatus 23 for measuring the pressure Pa of the plasma-generating gas in the circuit 8;
- an apparatus 24 for measuring the temperature Te of the cooling fluid arriving via the pipe 10;
- an apparatus 25 for measuring the temperature Ts of the cooling fluid leaving via the pipe 11;
- an apparatus 26 for measuring the flow rate Qe of the cooling fluid in the outlet pipe 11;
- an apparatus 27 for measuring the temperature Tv of the blast F;
- an apparatus 28 for measuring the pressure Pv of the blast F; and
- an apparatus 29 for measuring the flow rate Qv of said blast F.

Each of the measuring apparatuses 19 to 29 is connected to the control means 14 via a connection bearing the reference 30 to 40, respectively.

Thus, said control means 14 know continuously the value of the measurements of the parameters Ua, Ia, Qa, Pa, Te, Ts, Qe, Tv, Pv and Qv.

Moreover, by means of electrical connections 41 and 42 respectively, said control means 14 control the rectifier 4 and actuate the valve 9.

The actuation of the valve 9 by said control means 14 is performed by means of a pneumatic accelerator actuation device 43.

The actuation device 43 includes an electropneumatic valve positioner 44 receiving, on the one hand, the electrical commands generated by said control means 14 (via the connection 42) and, on the other hand, a low-pressure pneumatic supply via a conduit 45. By way of example, the electropneumatic positioner 44 may be of the 8013 type, manufactured by the French Company MASONEILAN, and the pressure of the pneumatic supply passing through the conduit 45 may be of the order of 1.4 bar. This low-pressure pneumatic supply may come from a pressure-reducing valve 46 which itself receives a high-pressure and high flow rate pneumatic supply from a source 47 via a conduit 48. The pneumatic pressure of the source 47 is, for example, of the order of 7 bar.

A flow amplifier 49, which itself actuates the valve 9, is interposed between the electropneumatic positioner 44 and the valve 9. The amplifier 49 receives the high pressure via a conduit 50 connecting it to the source 47 and the low actuation pressure via a conduit 51 connecting it to the electropneumatic positioner 44. It actuates the valve 9 via a conduit 52.

The flow amplifier 49 for actuating the valve 9 is, for example, of the 61 type manufactured by the French Company MAREG.

Figure 2:
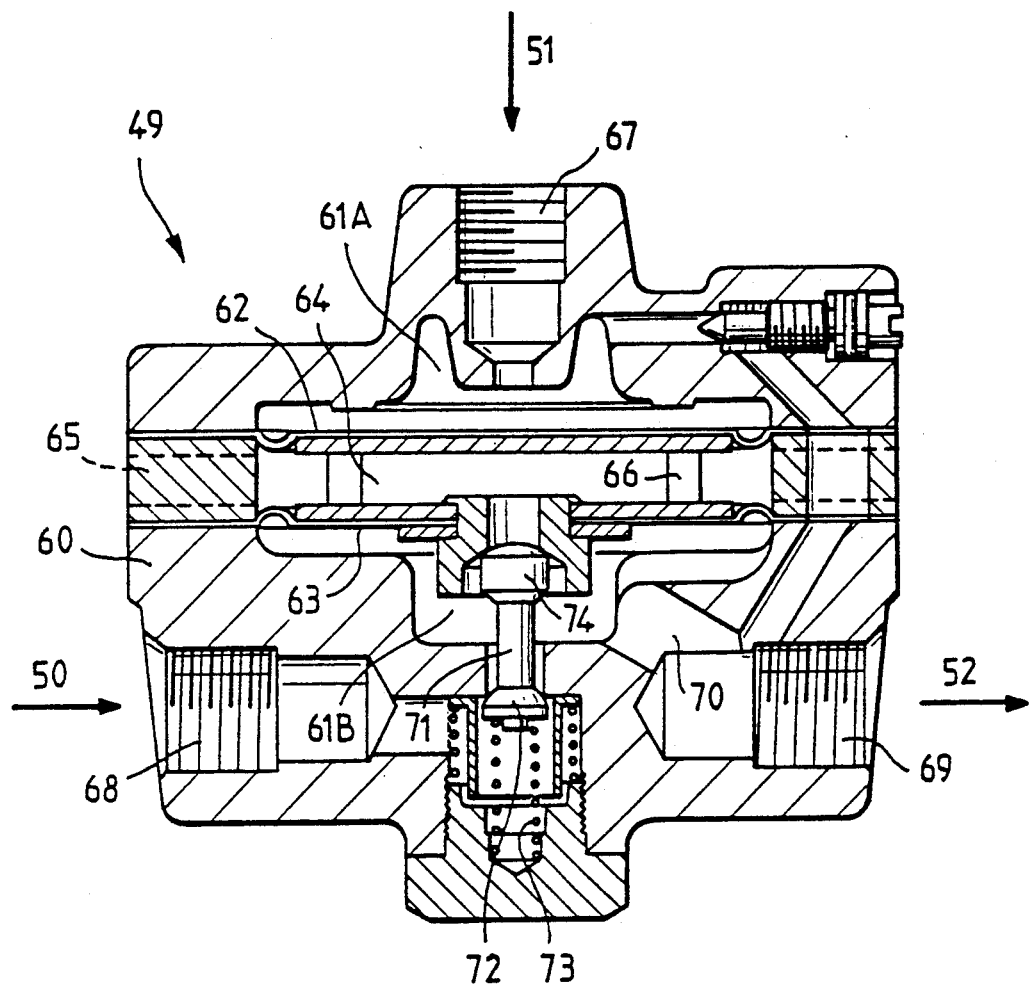
FIG. 2 is a section through a known pneumatic flow amplifier employed in the present invention.

The diagram of such a flow amplifier is shown in FIG. 2.

The known flow amplifier 49, shown in this figure, includes a body 60 defining an internal volume divided into two chambers 61A and 61B by an arrangement of two diaphragms 62, 63. The two parallel diaphragms 62 and 63 define between them a space 64 communicating with the outside via a passage 65. The two diaphragms 62 and 63 are mechanically linked together by spacers 66, but they may deform, to a certain extent, one with respect to the other.

A coupler 67 enables the chamber 61A to be connected to the low-pressure conduit 51, connecting the flow amplifier 49 to the electropneumatic positioner 44.

Couplers 68 and 69 are provided for connecting to the high-pressure conduit 50 and to the conduit 52, respectively. The coupler 69 communicates directly with the chamber 61B via a passage 70. On the other hand, the coupler 68 communicates with the chamber 61B via a needle 71 provided with a first valve 72 at one of its ends and pressed by a spring 73. The other end of the needle 71 is provided with a second valve 74 controlling the communication between the chamber 61B and the space 64.

When no actuating low pressure is applied through the conduit 51, the amplifier 49 is in the position illustrated in FIG. 2, that is to say that the valve 72 interrupts the communication between the conduit 50 and the chamber 61B (so that the outlet conduit 52 is isolated from the conduit 50) and that the valve 74 interrupts the communication between the chamber 61B and the space 64.

If an actuating low-pressure command is applied via the positioner 44 in the conduit 51, the diaphragms 62 and 63 press the needle 71, in opposition to the action of the spring 73, opening the valve 72 (the valve 74 remaining closed) and setting up a communication between the conduits 50 and 52, via the chamber 61B and the passage 70. The valve 72 is opened until the pressure in the chamber 61B and the conduit 52 is sufficient to balance the actuating low-pressure command from the conduit 51. It is rapid since the pressure signal in the conduit 52 is obtained from the conduit 50, that is to say from the high-pressure high flow-rate source 47. The accelerator 49 therefore speeds up the response time on opening the pneumatic-actuation valve 9.

Now, if the pressure of the low-pressure command in the conduit 51 decreases while the valve 72 is open, in the manner described hereinabove, the diaphragms 62 and 63 move toward the coupler 0-7, opening the valve 74. The chamber 61B is therefore exhausted via the space 64 and the passage 65, so that the pressure in the conduit 52 is reduced until it once again balances the inlet pressure in the conduit 51.

Here too, the amplifier 49 therefore speeds up the response time on closing the pneumatic-actuation valve 9, by virtue of rapid exhausting.

By virtue of the amplifier 49, the response time of the valve 9, which is generally of the order of 1 second, may be shortened, both on opening and on closing, to approximately 200 ms.

The system of FIG. 1 may operate in three modes:

A/ In the first mode, an operator or a process-supervising computer displays a desired electrical reference power at the input 15. In this case, from the parameters Ua and Ia, respectively supplied by the apparatuses 19 and 20, and from this electrical reference power displayed at the input 1.5, the control means 14 sequentially calculate the electrical commands for controlling the rectifier 4 and for actuating the valve 9, which commands appear on the connections 41 and 42. The electrical command of the connection 42 is converted into a pneumatic command by the positioner 44 and applied to the valve 9 by means of the flow amplifier or accelerator 49.

B/ In the second mode, the operator or the process-supervising computer displays a desired thermal reference power at the input 16. The control means 14 then receive, in addition to the parameters Ua and Ia, the parameters Qa, Ia, Pa, Te, Ts and Qe, which are respectively defined by the apparatuses 21, 22, 23, 24, 25 and 26. From all these parameters and from the displayed thermal reference power, the control means 14 determine an electrical reference power and sequentially establish the electrical commands for controlling the rectifier 4 and for actuating the valve 9, which commands are applied as described hereinabove.

C/ In the third operating mode, the operator or the process-supervising computer displays, at the input 17, a desired reference temperature for the blast F heated by the plasma jet J. The control means 14 receive, in addition to the parameters mentioned at B/, the parameters Tv, Pv and Qv, respectively supplied by the apparatuses 27, 28 and 29. From all said parameters and from the displayed reference temperature, the control means 14 determine a thermal reference power, and consequently the electrical reference power to be applied, and sequentially establish the electrical commands for controlling the rectifier 4 and for actuating the valve 9, which commands are applied as hereinabove.

For informative purposes, examples are given hereinbelow of values for the parameters of the plasma torch controlled by the system in accordance with the present invention:

arc current: 100 A to 2500 A;
arc voltage: 300 V to 5000 V;
power: 50 kill to 12.5 MW;
internal pressure of the torch: 0.1 bar to 7 bar;
flow rate of plasma-generating gas: 40 $Nm^3/h$ to 2500 $Nm^3/h$, under pressures of 4 to 15 bar.

I claim:

1. A system, for controlling a power plasma torch (1) having electrodes, said system comprising:
   a rectifier (4) fed by an electrical mains (5) and supplying a DC supply voltage to said electrodes (2, 3) of said torch;
   a circuit (8) feeding said torch with plasma-generating gas, the flow rate of said gas being controlled by a regulating valve (9);
   means (14) for controlling said rectifier and said valve in order to control the arc current and a plasma-generating-gas flow rate;
   first means (19) for continuously measuring the arc voltage; and
   second means (20) for continuously measuring the art current,
   said valve (9) for regulating the flow of plasma-generating gas being of the pneumatic-actuation type and being actuated by an electropneumatic positioner (44) associated with a pneumatic flow amplifier (49);
   said control means (14) receiving the arc-voltage and arc-current measurements delivered respectively by said first and second measuring means (19,20)

and delivering to said rectifier (4) and to said electro-pneumatic positioner (49) respectively, arc-current and plasma-generating-gas flow rate reference values adapted to produce a desired electrical reference power.

2. The system as claimed in claim 1, wherein said torch (1) is cooled by the circulation of a cooling fluid, including additional third, fourth and fifth measuring means (24, 25, 26) for determining the flow rate, the inlet temperature in the torch and the outlet temperature of the torch of said cooling fluid and which supply their measurements to said control means (14), which establish said electrical reference power from a selected thermal reference power.

3. The system as claimed in claim 2, including additional sixth, seventh and eighth measuring means (21, 22, 23) which determine the flow rate, the temperature and the pressure of the plasma-generating gas in said circuit (8) and which supply their measurements to said control means (14), which take them into account in the establishment of said electrical reference power from said thermal reference power.

4. The system as claimed in claim 2, for use with a torch adapted to heat a blast (F) of a blast furnace, further including ninth, tenth and eleventh measuring means (27, 28, 29) which determine the flow rate, the temperature and the pressure of said blast and which supply their measurements to said control means (14) which establish said thermal reference power from a reference temperature for said blast.

* * * * *

UNITED STATES PATENT AND TRADEMARK OFFICE
CERTIFICATE OF CORRECTION

PATENT NO.  : 5,294,773

DATED       : March 15, 1994

INVENTOR(S) : JEAN-MARIE LAMBERT

It is certified that error appears in the above-identified patent and that said Letters Patent is hereby corrected as shown below:

Column 3, line 52, "torch I" should be --torch 1--

Column 5, line 48, "0-7" should be --67--

Column 5, line 66, "1.5" should be --15--

Column 6, line 41, "50 kill" should be --50 kW--

Signed and Sealed this

Ninth Day of August, 1994

Attest:

BRUCE LEHMAN

Attesting Officer

Commissioner of Patents and Trademarks